(12) United States Patent
Yoshida

(10) Patent No.: US 6,860,540 B2
(45) Date of Patent: Mar. 1, 2005

(54) WINDSHIELD FIXING STRUCTURE FOR REDUCING DEAD VISIBILITY ANGLE PRODUCED BY FRONT PILLAR

(76) Inventor: Kazuhiro Yoshida, 820-2, Choukouji-cho, Omihachiman-shi, Shiga 523-0013 (JP)

( * ) Notice: Subject to any disclaimer, the term of this patent is extended or adjusted under 35 U.S.C. 154(b) by 0 days.

(21) Appl. No.: 10/474,098

(22) PCT Filed: May 17, 2002

(86) PCT No.: PCT/JP02/04795

§ 371 (c)(1),
(2), (4) Date: Oct. 6, 2003

(87) PCT Pub. No.: WO02/100671

PCT Pub. Date: Dec. 19, 2002

(65) Prior Publication Data

US 2004/0104591 A1 Jun. 3, 2004

(30) Foreign Application Priority Data

May 18, 2001 (JP) .................................. 2001-149904

(51) Int. Cl.⁷ .................................................. B60J 1/02
(52) U.S. Cl. ................................ 296/96.12; 296/203.03
(58) Field of Search ........................ 296/96.12, 203.03, 296/193.06

(56) References Cited

U.S. PATENT DOCUMENTS

| | | | | |
|---|---|---|---|---|
| 1,631,046 A | * | 5/1927 | McCullough | ............ 296/96.12 |
| D164,149 S | * | 8/1951 | Allen | ........................... D12/92 |
| 2,620,221 A | * | 12/1952 | Horace | ........................ 296/155 |
| D177,711 S | * | 5/1956 | Blumberg | ................... D12/182 |
| 2,817,559 A | * | 12/1957 | Nickles | .................... 296/96.12 |
| 2,924,485 A | * | 2/1960 | Miles | ....................... 296/96.12 |
| 3,027,186 A | * | 3/1962 | Charipar | ..................... 296/201 |
| 5,009,463 A | * | 4/1991 | Saitoh et al. | ................ 296/210 |
| 5,209,542 A | * | 5/1993 | Yoshizawa | .................. 296/84.1 |

FOREIGN PATENT DOCUMENTS

| | | |
|---|---|---|
| JP | 60-99715 | 6/1985 |
| JP | 7-17616 | 3/1995 |

* cited by examiner

Primary Examiner—Stephen Gordon
(74) Attorney, Agent, or Firm—Milde & Hoffberg, LLP

(57) ABSTRACT

A windshield fixing structure of a passenger car capable of assuring a high safety by preventing a dead angle obstructing a visibility from being produced in the slanting forward direction of a driver which comprises: a windshield; front pillars; and side panels, wherein the windshield is formed of a front part and both side parts and formed in a plate of substantially channel shape in cross section bent to a substantially right angle, each of the front pillars is provided on a body side-face part on the side of a steering wheel in a substantially vertical direction from the side panel, and the vertical width of each of the side panels is gradually reduced from the portion of the windshield substantially just below a bend of the substantially right angle to the portion of the windshield where the front pillar is provided vertically.

2 Claims, 5 Drawing Sheets

PRIOR ART

PRIOR ART

WINDSHIELD FIXING STRUCTURE FOR REDUCING DEAD VISIBILITY ANGLE PRODUCED BY FRONT PILLAR

FIELD OF THE INVENTION

The present invention relates to a windshield fixing structure for fixing both side ends of a windshield to front pillars of a body. More particularly, the present invention relates to a windshield fixing structure for reducing a dead visibility angle in which a windshield for obstructing the cabin front of a passenger car or the like has both side parts substantially parallel with side faces of the body and is fixed at both side parts to the front pillars positioned backwardly receded from the body.

BACKGROUND OF THE INVENTION

In a conventional windshield fixing structure of a body wherein both side ends of a windshield were fixed respectively to a pair of front pillars, the front pillars were disposed in a slanting forward direction of a steering wheel, which caused an increase of a dead angle of a driver due to obstruction of a visibility in the slanting forward direction of the driver.

FIGS. 6, 7, and 8 respectively show a windshield fixing structure 2 of a conventional body. FIG. 8 is a sectional diagram in a horizontal direction of a windshield fixing structure 2 shown in FIGS. 6 and 7, and shows alignment among a windshield 4, front pillars 6, a steering wheel 8, and a driver 10. The slanting forward direction of a front pillar 6 is a dead angle C of visibility when seeing from the driver 10.

More particularly, in the windshield fixing structure 2, a pair of front pillars 6 for fixing a windshield 4 of a body 1 are positioned in a substantially slanting forward direction of the driver 10 sitting on the driver seat. This obstructs the visibility of the driver 10 in the slanting forward direction, and the range shown in FIG. 8 is a dead angle C.

In view of these circumstances, an enlargement of forward visibility by widening the area of a windshield has been suggested. For instance, you can see this on page 24 of Automotive Engineering Directory Volume 13 titled "Body of a passenger car." In this aspect, however, it is impossible to prevent front pillars from producing a dead angle obstructing visibility in a slanting forward direction because the front pillars are disposed at the corners of window sides. Further, the Japanese Patent Publication No. 60-99715 discloses a windshield bent at the corners of window sides. In this aspect, it is also impossible to prevent a dead angle obstructing visibility from being produced because front pillars are disposed at the corners of the window sides.

Accordingly, each of side panels 40 can be reinforced by increasing the width of an end part 42 of the side panel 40 like a dotted line A, but it is not preferable to increase the width of the end part 42 due to an extreme decrease of the area of a door 54. On the other hand, when the width of the end part 42 of the side panel 40 is decreased like a dotted line B, as mentioned above, there may be fear that the end part 42 of the side panel 40 does not have sufficient strength to support a load imposed from a roof of the body through the windshield 24 and the front pillars 26.

In addition, the applicant of the present invention suggested a device shown in the Japanese Utility Model Publication No. 7-17616. In this device, a windshield bent at the corners of window sides is disclosed as in the case mentioned above, but no specific structure of side panels (portions to support front pillars) to support a load imposed from a roof of the body has been disclosed in the publication. In other words, the side panels require strength to sustain the load imposed from the roof of the body. It is, however, mechanically preferable to dispose the side panels substantially just below the front pillars when the front pillars are positioned at the corners of the window sides. The problem with structure is that the size of a front door has to be as small as it may cause inconvenience when getting on or off the front seat to secure space to provide side panels.

DISCLOSURE OF THE INVENTION

It is an object of the present invention to provide a windshield fixing structure for solving the above-mentioned problem and reducing a dead visibility angle of a driver produced by front pillars as well as securing sufficient space for getting on or off the front seat.

A windshield fixing structure of a body for reducing a dead visibility angle produced by front pillars with both side ends of a windshield respectively fixed using front pillars according to the present invention which comprises: a windshield; front pillars; and side panels, wherein the windshield is formed of a front part and both side parts continued to the front part substantially parallel with the side face of the body and formed in a plate of substantially channel shape in cross section bent to a substantially right angle, each of the front pillars is provided on a body side-face part on the side of a steering wheel in a substantially vertical direction from the side panel, and the vertical width of each of the side panels is gradually reduced from the portion of the windshield substantially just below a bend of the substantially right angle to the portion of the windshield where the front pillar extends upward.

In the windshield fixing structure for reducing a dead visibility angle produced by front pillars according to the present invention, the front pillars supported by the side panels extend upward in a substantially vertical position when seeing the body from the side.

In this specification, the major portion of the windshield crosses the body and both side parts having substantially a triangle side view shape along the side of the body respectively extend from the both side ends of this major portion.

Furthermore, the plate of substantially channel shape in cross section is of a cross-sectional shape when cutting a major portion and both side ends of the windshield at a horizontal plane.

In addition, a side panel is used as a support in a shape along the side of the body disposed at an opening for getting on or off the driver's seat or the front seat, that is, an opening surrounded by a roof drip, a front pillar, a center pillar, and a side sill in all directions by obstructing a part of this opening.

DESCRIPTION OF THE PREFERRED EMBODIMENTS

A preferred embodiment of a windshield fixing structure for reducing a dead visibility angle produced by front pillars according to the present invention will now be described in detail on the basis of the accompanying drawings.

Figure 1:
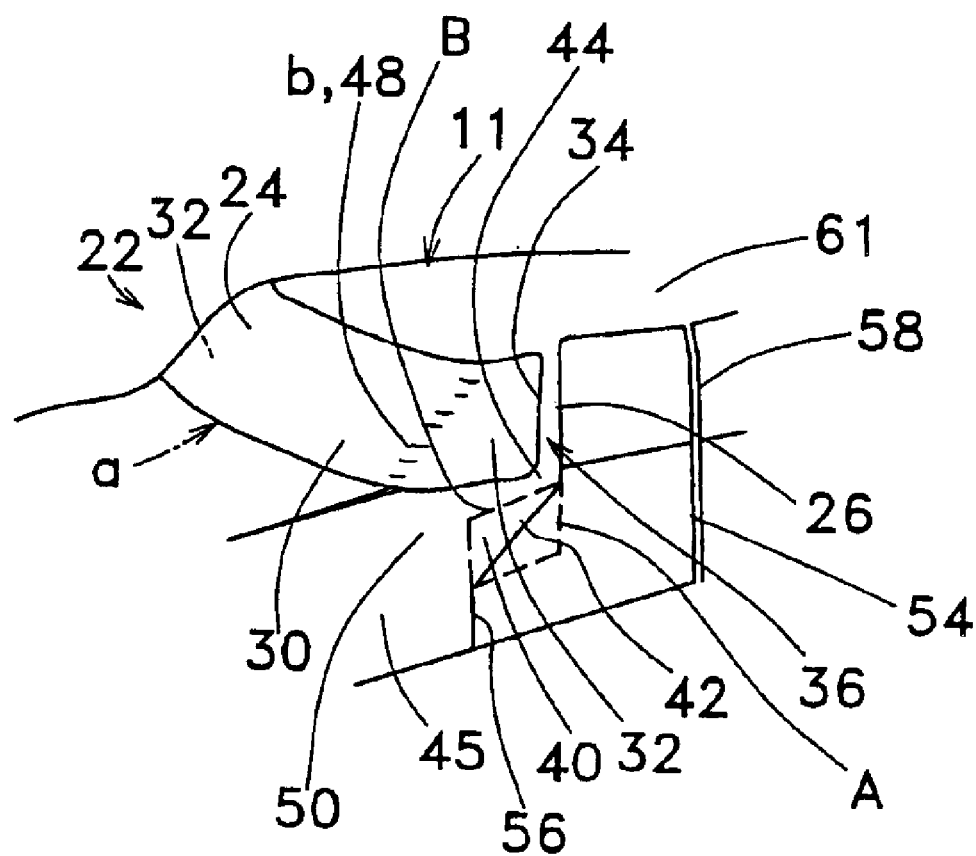
FIG. 1 is an essential part perspective view showing a preferred embodiment of a windshield fixing structure for reducing a dead visibility angle produced by front pillars according to the present invention.
Figure 2:
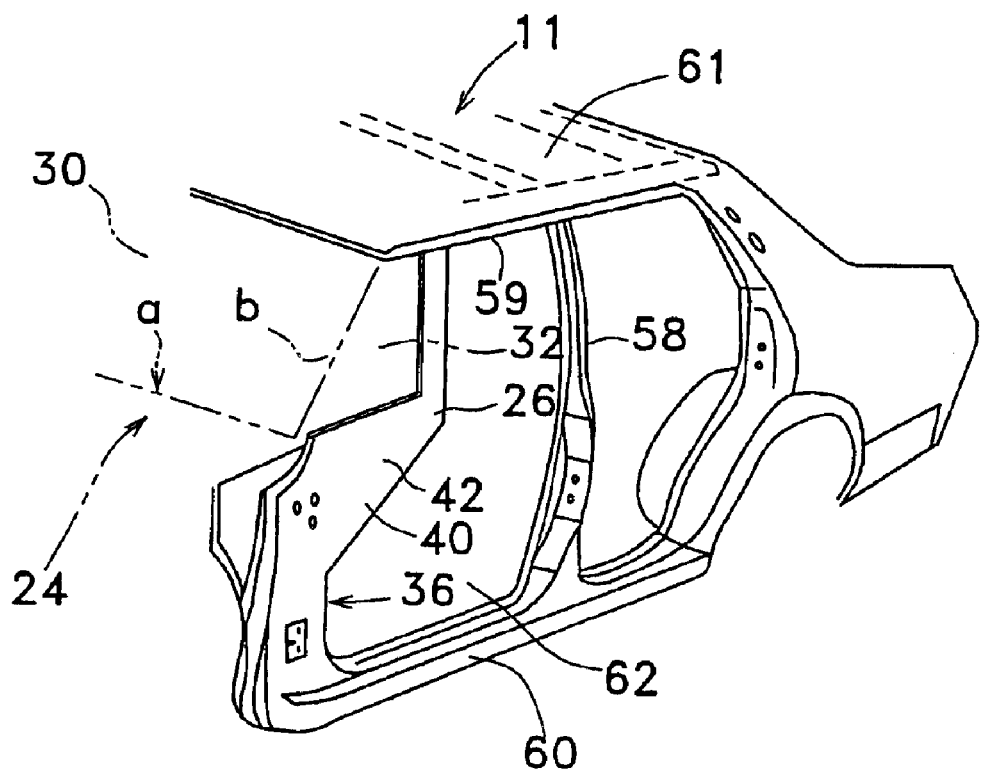
FIG. 2 is a cutaway view of an essential part of the windshield fixing structure for reducing a dead visibility angle produced by front pillars according to the present invention shown in FIG. 1.

In FIGS. 1 and 2, a windshield fixing structure 22 for reducing a dead visibility angle produced by front pillars of the present invention used for a body 11 comprises: a windshield 24; and a pair of front pillars 26 for fixing the windshield 24. The windshield 24 is a plate-like glass formed of a front part 30 having a vertical face or a having a face slanting in a vertical direction as an essential part and both side parts 32 continued to the front part 30 and substantially parallel with the side of the body 11. More particularly, the windshield 24 respectively extends both side ends 34 along the side of the body 11 from the both side parts 32.

The front part 30 intersects a bonnet of the body 11 or the like at the height shown by a virtual line a and the lower end of the front part 30 buries downward the bonnet or the like. Each of the both side parts 32 has a substantially triangle shape when seeing from the side along the side face 36 of the body 11. A substantial triangle is a shape in which three sides are surrounded by an edge line b between the front part 30 and one of the both side parts 32, the front pillar 26, and the side panel 40.

Figure 3:
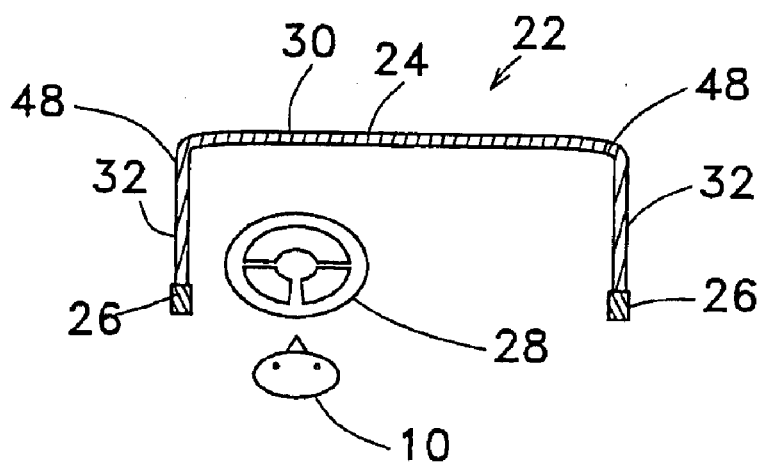
FIG. 3 is a transverse sectional diagram showing the windshield fixing structure for reducing a dead visibility angle produced by front pillars shown in FIG. 1.

It is preferable for the front part 30 to slant in a vertical direction because of the enlargement of forward visibility. More specifically, this windshield 24 is formed in a plate of substantially channel shape in cross section bent to a substantially right angle. The both side ends 34 of the windshield 24 are respectively fixed to the front pillars 26. As shown in FIGS. 1 to 3, each of the front pillars 26 is provided on the side face 36 of the body on the side of a steering wheel 28 in a substantially vertical direction from the side panel 40 when the body 11 is seen from the side. The front pillar 26 may slant in a cross direction or may slant in a direction along the side face 36 of the body 11, in other words, the front pillar 26 may slant in a vertical direction.

FIG. 3 is a cross-sectional view in a horizontal direction of the windshield fixing structure 22 for reducing a dead visibility angle produced by front pillars shown in FIGS. 1 and 2. FIG. 3 shows alignment among the windshield 24, front pillars 26, a steering wheel 28, and a driver 10. Since the direction of the front pillars 26 is substantially just parallel when seeing from the driver, there are no dead angles because of no obstruction in a slanting forward direction. The front part 30 of the windshield 24 is substantially orthogonal to the side parts 32 when seeing from a cross section in a horizontal direction like FIG. 3.

Further, in the windshield fixing structure 22 for reducing a dead visibility angle produced by front pillars shown in FIGS. 1 and 2, the side panel 40 is a support in a shape along the side face 36 of the body 11 provided on an opening 62 exclusively used for getting on or off the driver's seat or the front seat, that is, an opening surrounded by a roof drip 59, the front pillar 26, a center pillar 58, and a side sill 60 with a part of this blocked in all directions.

An end part 42 of the side panel 40 gets narrower where the front pillar 26 extends upward. It is, therefore, preferable to secure sufficient strength by reinforcing the side panel 40 so that the side panel 40 can sustain a load imposed from a roof 61 of the body 11 through the windshield 24 and front pillar 26.

As has been described so far, the side panel 40 is reinforced by increasing the width of the end part 42 of the side panel 40 like a dot line A. That is, however, not preferable because the area of a door 54 is extremely reduced by the increasing of the width of the end part 42. Alternatively, if the width of the end part 42 of the side panel 40 is reduced like a dot line B, as described above, the end part 42 of the side panel 40 might not have enough strength to support a load imposed from the roof of the body through the windshield 24 and the front pillar 26.

For the windshield fixing structure 22 for reducing a dead visibility angle produced by front pillars according to the present invention, this problem has been solved by increasing the width of the end part 42 of the side panel 40 at the portion where a side panel unit 45 is connected to and decreasing the width at an end 44 connected to the front pillar 26. More specifically, in the windshield fixing structure 22 for reducing a dead visibility angle produced by front pillars according to the present invention, the vertical width of the side panel 40 is gradually reduced from a bend 48 of the windshield 24 bent to a substantially right angle, that is, from a portion 50 of the windshield 24 substantially just below the position an edge line b is formed to the end part 42 where the front pillar 26 extends upward.

This enables to sufficiently improve the strength of the end part 42 of the side panel 40 so that the end part 42 of the side panel 40 can support the load imposed from the roof 61 of the body 11 through the windshield 24 and the front pillars 26. That is because deformation of the body 11 is minimized by the securing of high rigidity in the body 11. In addition, there is an advantage of not causing any inconvenience when getting on or off the driver's seat or the front seat because the area of the opening 62 for getting on or off the driver's seat or the front seat is not restricted and sufficient area of the door 54 can be secured regardless of the side panel 40 provided.

Figure 4:
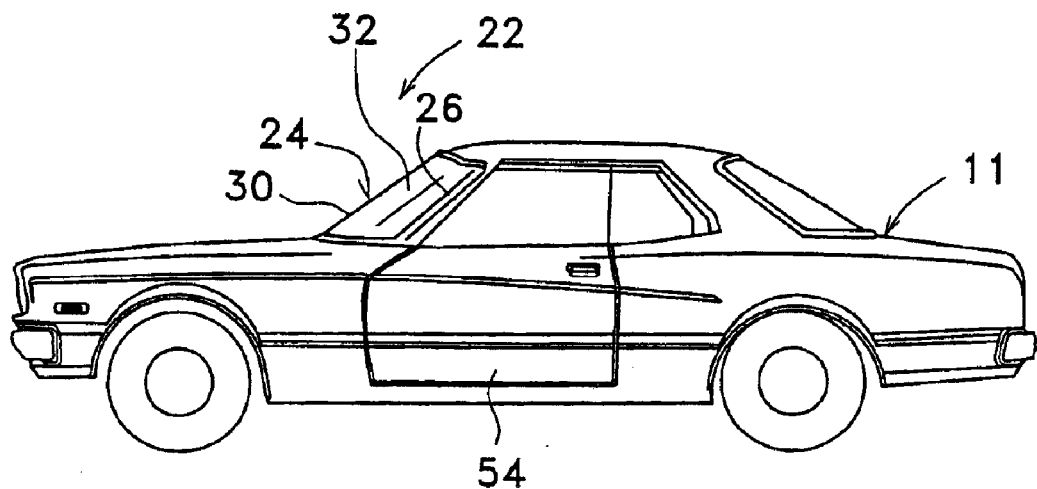
FIG. 4 is a side view of a vehicle showing another embodiment of a windshield fixing structure for reducing a dead visibility angle produced by front pillars according to the present invention.
Figure 5:
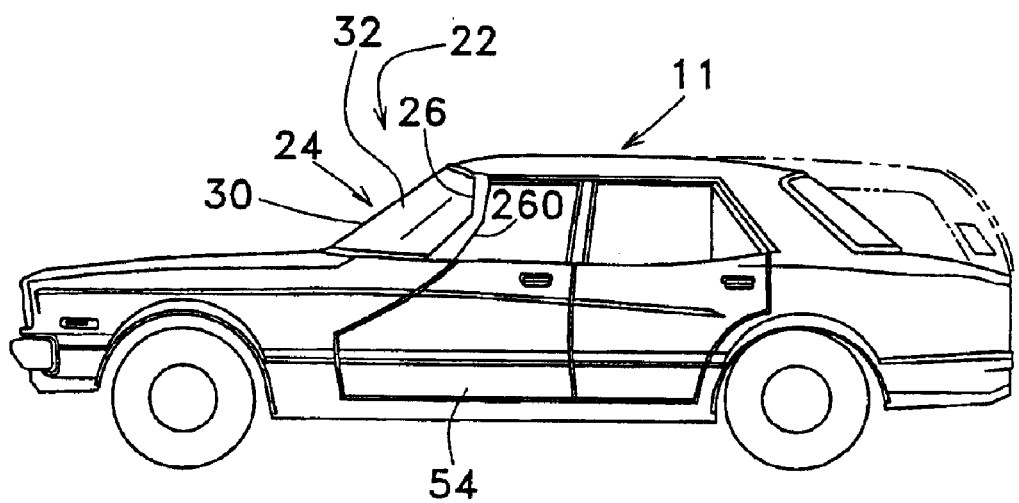
FIG. 5 is a side view of a vehicle showing still another embodiment of the windshield fixing structure for reducing a dead visibility angle produced by front pillars according to the present invention.
Figure 6:
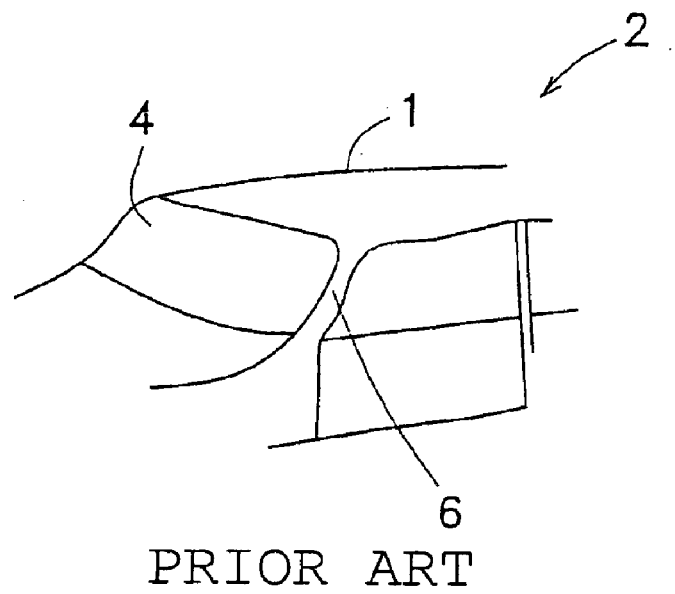
FIG. 6 is an essential part perspective view showing an embodiment of a conventional windshield fixing structure.
Figure 7:
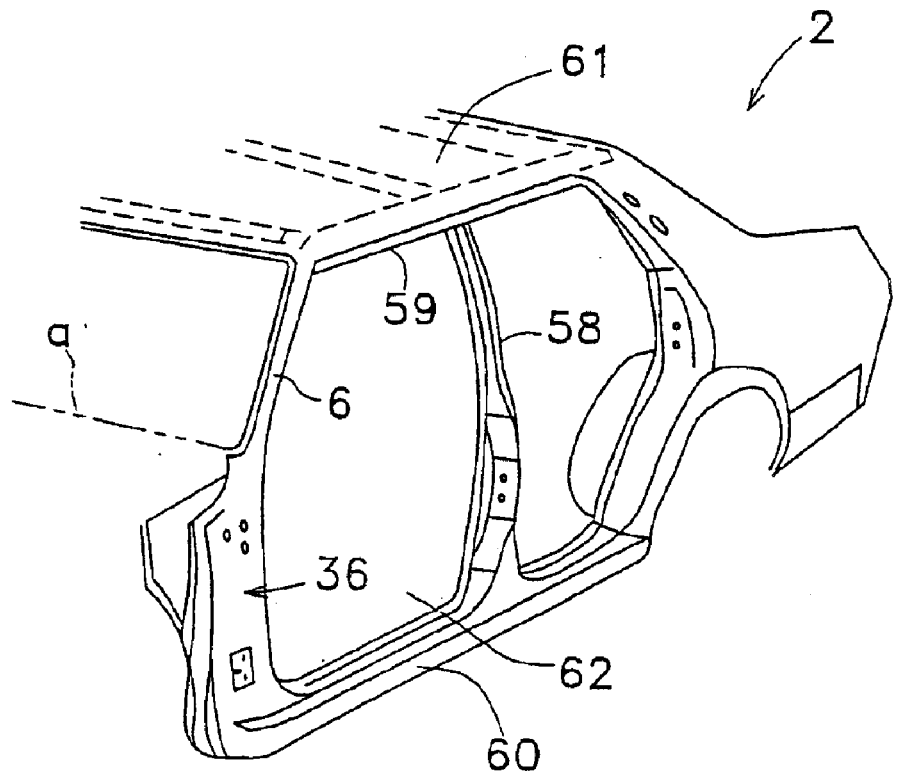
FIG. 7 is a cutaway view of an essential part of the windshield fixing structure for reducing a dead visibility angle produced by front pillars shown in FIG. 6.
Figure 8:
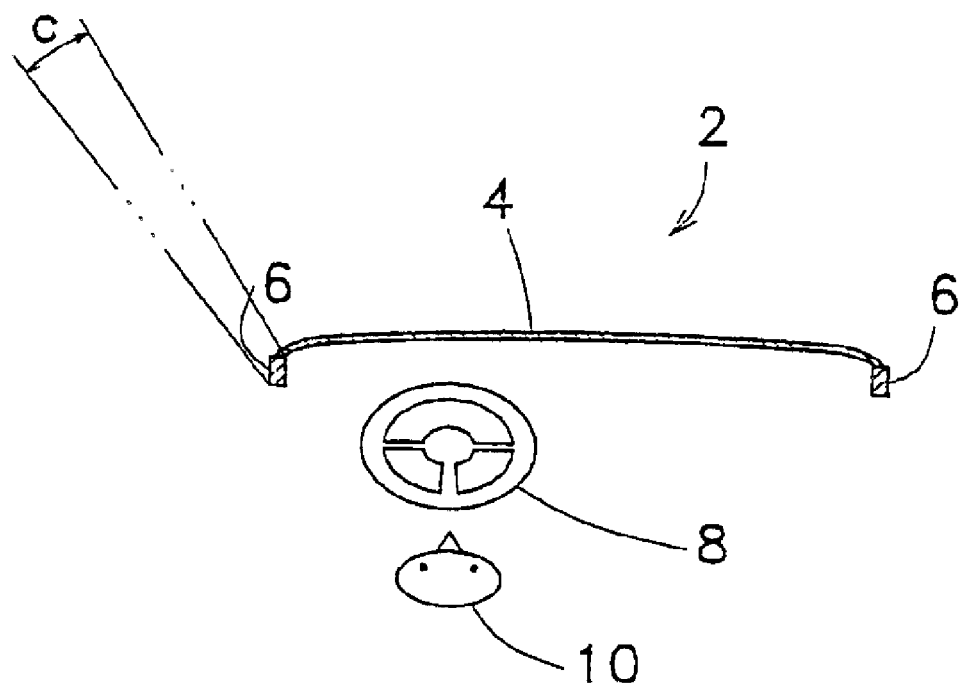
FIG. 8 is a transverse sectional view of the windshield fixing structure shown in FIG. 7.

The preferred embodiments of the windshield fixing structure for reducing a dead visibility angle produced by front pillars according to the present invention have been described so far on the basis of FIGS. 1 to 3, but the present invention is not limited to the above-mentioned embodiments. For example, FIG. 4 is a side view of a vehicle showing another embodiment of the present invention and FIG. 5 is a side view of a vehicle showing still another embodiment of the present invention. As shown in FIG. 4, the entire front pillar 26 may be in a slanting position so that the upper end may lean to the backward of the body 11. Alternatively, as shown in FIG. 5, the vicinity of the lower end of the front pillar 26 is in a slanting position as well as the above, and only the vicinity of the upper end of the front pillar 26 may be in a shape which extends in a substantially vertical direction by longitudinally flexing 260 in midway of the front pillar 26.

The technical scope of the present invention includes any and all modifications, variations or equivalent arrangements which may occur to those skilled in the art should be considered to be within the scope of the invention. Further, the structure of the invention which comprises the present invention may be implemented in a preferred embodiment replaced by other technology within the scope of the action or effects of the present invention.

INDUSTRIAL APPLICABILITY

The windshield fixing structure of the present invention is capable of fixing both side parts of a windshield which obstruct the front cabin of a passenger car or the like to front pillars positioned backwardly receded from the body. This does not produce a dead visibility angle obstructing a visibility in a slanting forward direction of the driver and enables to secure sufficient area of a front door while having enough strength on the end parts of side panels to support the windshield and the front pillars. Accordingly, it is possible to assure a high safety when running by the application of the present invention to passenger cars or the like.

There has thus been shown and described a novel windshield fixing structure for reducing a dead visibility angle produced by front pillars which fulfills all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All changes, modifications, variations and other uses and applications which do not depart from the spirit and scope of the present invention are deemed to be covered by the invention, which is to be limited only by the claims which follow.

What is claimed is:

1. A windshield fixing structure for fixing a windshield to an automobile body having side-face parts on both sides of a steering wheel, comprising:

a windshield having a front-forming part and side-forming parts continued to the front-forming part substantially parallel with the side-face parts on both sides of the body and formed in a plate of substantially channel shape in cross section bent to a substantially right angle;

side panels provided on both sides of the side-face parts of the body; and front pillars which respectively extend upward in a substantially vertical direction from the side panels, wherein each of said side-forming parts on both sides of the windshield is fixed at each of said side-face parts on both sides of the body with the front pillars, and the vertical width each of said side panels is gradually reduced from a portion of the side panel substantially just below the bend of the substantially right angle to a portion of the side panel on which each of the front pillars extends upward to reduce a dead visibility angle produced by the front pillars.

2. The windshield fixing structure according to claim 1, wherein said front pillars supported by said side panels extend upward in a substantially vertical position when viewing the body from a side.

\* \* \* \* \*